United States Patent
Plow et al.

(10) Patent No.: US 7,979,492 B2
(45) Date of Patent: Jul. 12, 2011

(54) TIME DECAYED DYNAMIC E-MAIL ADDRESS

(75) Inventors: Gregory M. Plow, Gilroy, CA (US); Farrokh E. Pourmirzaie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 10/991,200

(22) Filed: Nov. 16, 2004

(65) Prior Publication Data

US 2006/0106914 A1  May 18, 2006

(51) Int. Cl.
*G06F 15/16* (2006.01)
(52) U.S. Cl. ....................................................... 709/206
(58) Field of Classification Search ................. 709/207, 709/206
See application file for complete search history.

(56) References Cited

U.S. PATENT DOCUMENTS

| | | | | |
|---|---|---|---|---|
| 5,930,479 | A * | 7/1999 | Hall | 709/238 |
| 6,061,789 | A | 5/2000 | Hauser et al. | 713/168 |
| 6,088,720 | A * | 7/2000 | Berkowitz et al. | 709/206 |
| 6,608,888 | B2 | 8/2003 | Bedingfield et al. | 379/88.22 |
| 6,691,156 | B1 | 2/2004 | Drummond et al. | 709/206 |
| 6,721,784 | B1 * | 4/2004 | Leonard et al. | 709/206 |
| 6,868,498 | B1 * | 3/2005 | Katsikas | 726/14 |
| 2002/0138581 | A1 * | 9/2002 | MacIntosh et al. | 709/206 |
| 2002/0169793 | A1 * | 11/2002 | Sweeney | 707/204 |
| 2003/0177189 | A1 * | 9/2003 | Tomono | 709/206 |
| 2003/0208457 | A1 * | 11/2003 | Iyengar | 707/1 |
| 2004/0049787 | A1 * | 3/2004 | Maissel et al. | 725/46 |
| 2004/0051735 | A1 * | 3/2004 | Daniel | 345/752 |
| 2004/0064734 | A1 * | 4/2004 | Ehrlich | 713/201 |
| 2004/0107262 | A1 * | 6/2004 | Suzuki et al. | 709/207 |
| 2004/0143633 | A1 * | 7/2004 | McCarty | 709/206 |
| 2004/0199781 | A1 * | 10/2004 | Erickson et al. | 713/200 |
| 2005/0114496 | A1 * | 5/2005 | Fang et al. | 709/224 |
| 2005/0198173 | A1 * | 9/2005 | Evans | 709/206 |
| 2005/0201536 | A1 * | 9/2005 | LaLonde et al. | 379/93.24 |
| 2006/0026246 | A1 * | 2/2006 | Fukuhara et al. | 709/206 |
| 2006/0149708 | A1 * | 7/2006 | Lavine | 707/3 |
| 2008/0126362 | A1 * | 5/2008 | Shoemaker et al. | 707/10 |

FOREIGN PATENT DOCUMENTS

| | | |
|---|---|---|
| JP | 2000242579 A2 | 9/2000 |
| JP | 2001331418 A | 11/2001 |
| JP | 2003167829 A2 | 6/2003 |

OTHER PUBLICATIONS

"More Information About Keymail Policies:: The Titan Key Message Board". [online]. © 2000-2004 <retrieved on Oct. 12, 2004>. Retrieved from the Internet. <URL: http://www.thetitankey.com/forum//?f=8&m=197>.

(Continued)

*Primary Examiner* — Kevin Bates
*Assistant Examiner* — Oleg Survillo
(74) *Attorney, Agent, or Firm* — Janet M. Skafar; Ingrid M. Foerster

(57) ABSTRACT

Various embodiments of a method, system and computer program product provide e-mail from a user with a primary e-mail address. A temporary e-mail address is generated. The temporary e-mail address is associated with a time decay attribute and the primary e-mail address. The e-mail is sent using the temporary e-mail address as a sender e-mail address.

24 Claims, 9 Drawing Sheets

OTHER PUBLICATIONS

"The Titan Key stops spam before it's ever sent". [online]. © 2003 <retrieved on Oct. 12, 2004>. Retrieved from the Internet. <URL: http://www.titankey.com/>.

"Stop Spam with Titan KeyMail Server: What is Titan KeyMail Server?" [online]. © 2003 <retrieved on Oct. 12, 2004>. Retrieved from the Internet. <URL: http://www.titankey.com/productInfo/whatIsKM.html>.

"E-threats Impact Workplace," Security, Cahners Publishing, vol. 36, Issue 5, pp. 14-18, May 1999.

David Mazières and M. Frans Kaashoek, "The Design, Implementation and Operation of an Email Pseudonym Server," 5$^{th}$ Conference on Computer and Communications Security, San Francisco, CA, USA, pp. 27-36.

Marjory S. Blumenthal and David D. Clark, "Rethinking the Design of the Internet: The End-to-End Arguments vs. The Brave New World," ACM Transactions on Internet Technology, vol. 1, No. 1, Aug. 2001, pp. 70-109.

Simple Mail Transfer Protocol. [online]. © 2001 The Internet Society <retrieved on Sep. 13, 2004>. Retrieved from the Internet: <URL: http://www.ietf.org/rfc/rfc2821.txt>.

Internet Message Format. [online]. © 2001 The Internet Society <retrieved on Sep. 13, 2004>. Retrieved from the Internet: <URL: http://www.ietf.org/rfc/rfc2822.txt>.

\* cited by examiner

180 ⟵

182 ⟶

From: JDoe12315@xyz.com   To: [    ]
Date: Aug. 10, 2004   Cc: [    ]
   Subject: [    ]
184 ⟶
This e-mail address is valid for 5 days.
Please reply on or before: Aug. 15, 2004

Please send information as advertised.

From: JDoe12315@xyz.com   To: [    ]
Date: Aug. 10, 2004   Cc: [    ]
   Subject: [    ]
192 ⟶
This e-mail address is valid for 5 days.
Please reply on or before: Aug. 15, 2004

Please send information as advertised.

FIG. 8

TIME DECAYED DYNAMIC E-MAIL ADDRESS

BACKGROUND OF THE INVENTION 1.0 Field of the Invention

This invention relates to e-mail; and in particular, this invention relates to a time decayed dynamic e-mail address.

2.0 Description of the Related Art

Electronic mail, that is e-mail, has become the communication method of choice throughout the business world as well as for the general public. The rapid increase in the number of users of the Internet has made e-mail an attractive advertising medium. E-mail is now frequently used as the medium for widespread marketing broadcasts of messages to large numbers of e-mail addresses. Consequently, e-mail users are facing a growing problem of unsolicited mass e-mails. Unsolicited mass e-mail is typically defined as e-mail messages that are sent in very large quantities to as many recipients as possible, regardless of the desire of the recipients to receive those messages. Sending unsolicited mass e-mail messages is commonly known as spamming. Large service providers and corporations are particularly susceptible to this practice. The senders of unsolicited mass e-mail, hereafter called mass-mailers, typically not only ignore user requests to be removed from future mass mailings, they also typically gather e-mail addresses to sell to other mass mailers.

Mass-mailers collect e-mail addresses from several sources and through elaborate means. For example, mass-mailers collect e-mail addresses from the Internet. Recipients often post their e-mail addresses on web sites or in online forums, and mass-mailers collect the posted e-mail addresses with special tools called "address harvesters". In another example, mass-mailers use promotional web sites to collect e-mail addresses. Some mass-mailers create a web site in which a user is enticed to enter their e-mail address for a chance to win a small prize, and their e-mail address is thereafter included in the mass-mailers' address lists. In yet another example, mass-mailers collect e-mail addresses from legitimate contact lists. Some companies periodically sell the names and e-mail addresses of potential prospects and mass-mailers purchase these e-mail addresses. Address and contact lists are also part of the assets that are liquidated when a company goes bankrupt. Mass-mailers buy these e-mail addresses and resell them to other mass-mailers.

Once an e-mail address has been included in the list used by a mass-mailer, typically that e-mail address will quickly be resold and used by many other mass-mailers. The recipient will receive an ever-larger amount of unsolicited e-mails. Such an e-mail address is then said to be compromised.

Protecting an e-mail address from being compromised through address harvesters and promotional web sites is relatively straightforward—don't post the e-mail address and don't give the e-mail address to unknown entities. However, there are needs and temptations that make this discipline unlikely for many users.

Typically, it is very difficult to protect an e-mail address from being purchased by mass-mailers as part of a legitimate contact list. Corporate workers must often give their e-mail address to contacts, suppliers, customers and other entities or persons outside their company, each of which can potentially disseminate the e-mail addresses and add them to mass-mailing lists.

The desire to reduce unsolicited mass e-mail has led to numerous technical solutions. Technical solutions include a number of filtering techniques as follows.

1. Filtering known senders. Blocking e-mails from particular e-mail addresses, that is, e-mail addresses of senders known to originate unsolicited e-mail, filters the unsolicited e-mail. This approach, however, is vulnerable to rapid changes in the e-mail address of the source of the unsolicited e-mail. The sources of the unsolicited e-mail can easily change their e-mail address because unsolicited e-mail is typically generated by automated means. For example, mass-mailers often automatically forge their sender address, that is, the "From:" field of an e-mail. Such approaches also typically require the set up and maintenance of a complex filtering mechanism which frequently becomes obsolete shortly after implementation as mass-mailers adjust to the new defenses.

2. Filtering all unknown senders. The filtering of all unknown senders is also referred to as "white listing". Such filtering is not always practical because corporate recipients often receive e-mails from new contacts, after initiating communication through the phone or in person.

3. Filtering by detection. This filtering technique is also known as "message matching". This method employs several e-mail addresses that are posted on the Internet for the express purpose of being harvested by mass-mailers and being compromised. The idea is that if these e-mail addresses receive a message, that message will be unsolicited e-mail, and all similar e-mail messages can be tagged as unsolicited e-mails. However, mass-mailers are sprinkling messages with random parts, adding or changing character strings in individual messages, which can defeat the message matching systems.

4. Filtering on content. Many unsolicited mass e-mails contain "trigger words" that can be detected by filtering software. For instance, the word "mortgage" is unlikely to show up in your professional e-mail if you aren't in the real estate business, but is frequent in unsolicited mass e-mail messages. Filtering e-mail on content can be quite efficient at detecting unsolicited e-mail. However, recent trends in unsolicited mass e-mails show that mass-mailers avoid trigger words by misspelling or altering them, for example, "m0rtgage" or "m:or.t.gage" instead of "mortgage", which decreases the filters' efficiency. Mass-mailers also fool naive filtering software by inserting comments within HTML messages to break trigger words (e.g., "mo<!--ZZZZ-->rtgage"). Note that this insertion of useless strings in the unsolicited mass e-mail messages tends to increase their average size.

5. Filtering by adapting. Adaptive filters can be taught to recognize the format and layout of unsolicited mass e-mail messages, which often rely on HTML formatting with several images. However, legitimate e-mails containing genuine press releases and newsletters are also just as likely to be filtered as unsolicited e-mail. In addition, mass-mailers have begun to send unsolicited e-mails with JavaScript encoding as well as e-mail entirely composed of one or more images, which are typically not filtered on content. These JavaScript-encoded and image-based unsolicited mass e-mail messages are of ever-increasing sizes.

6. Filtering at client location. Filtering e-mail at the client location also has problems. When filtering is performed at the client location, unsolicited mass e-mail is sent to the recipient's machine, only to be discarded by the recipient's mail agent. Meanwhile, the network connection of the recipient's machine is clogged by unsolicited e-mails. When the recipient downloads e-mail using a slow dial-up connection, such as when the recipient is away from a corporate office equipped with high-speed networking, the time wasted by downloading unsolicited e-mail can seriously impact productivity.

7. Filtering by wireless devices. A growing number of portable, wireless devices can receive e-mail. The service providers generally sell wireless connectivity by the hour or by the megabyte. When an e-mail address associated with one of these devices is compromised, unsolicited e-mails become a problem because the recipient must typically download the unsolicited e-mail on a slow and expensive connection. Even if an unsolicited e-mail is identified as such, that e-mail message typically has to be downloaded.

8. Filtering by performing a designated function. Some e-mail systems, for example, Qualcomm's® (Registered Trademark of Qualcomm Incorporated) Eudora® (Registered Trademark of Qualcomm Incorporated) Pro, allow the end user to set filters that can be set to scan incoming e-mail and then perform a designated function with that e-mail. Such programs have been set up to scan for messages that do not contain a user's personal e-mail address and to filter such messages into a "hold for review" mailbox. By transferring messages that are not personally addressed, the system can be programmed to attempt to filter out unsolicited e-mails.

9. Filtering through identification data. Another approach to filtering unsolicited e-mail is creation of an inclusion list by the user to include identification data for identifying e-mail desired by the user. Data from one or more fields of incoming e-mail are compared with the identification data stored in the inclusion list. If no match is detected, the system performs at least one heuristic process to determine whether the e-mail may be of interest to the user. If the e-mail message does not satisfy any heuristic criteria, the message may be marked with a display code, such as "junk."

10. Filtering by digital signatures. Yet another approach to the problem of filtering unsolicited e-mail is provided by products that attach digital signatures to outgoing mail and then monitor incoming mail looking for valid signatures. One such product is available commercially as AuthentiMail™, from Omnipoint Technologies, Inc. This system uses an intermediary server between the external Internet and an internal mail server. Before e-mail is delivered to the Internet, a signature is attached to the message to protect the user's e-mail address. If a third party server tries to forward the message or compile the sender's name in a mailing list, the signature is invalidated to prevent spamming. This technique uses elaborate schemes and algorithms for creation and use of digital signatures.

11. Filtering through use of disposable e-mail addresses. In some systems which use disposable e-mail addresses, each e-mail user maintains a pool of disposable e-mail addresses, all going to the same mailbox. The user requests a disposable address from the mail server via a software tool. Each disposable e-mail address is given to a small number of entities, and ideally only to one. When an e-mail address starts receiving unsolicited e-mails, the recipient can revoke it. This address will then be considered compromised. If the address has been given to a single entity, this entity will then be considered as a source of unsolicited e-mails, and corporate policies for dealing with such entities can be activated. If the address has been given to more than one entity, each entity can be informed automatically that the recipient's address is changing to a new one. Then each entity is given a separate address. The system stores information which associates the disposable addresses which have been used with the senders who used the disposable addresses.

Some e-mail systems provide on-the-fly disposable e-mail addresses. For a pre-registered disposable e-mail address, a user manually creates and registers a new disposable e-mail address with the mail server before that e-mail address is used. This is not convenient.

In an on-the-fly disposable e-mail address, a user, such as a sender or a system administrator, manually creates a new disposable e-mail address on-the-fly which is unique for each sender. In an on-the-fly disposable e-mail address system, each user has a set of e-mail addresses which are all forwarded to the same mailbox. Like every Internet e-mail address, an on-the-fly disposable e-mail address is made of two parts, a mailbox identifier (id) and the host name, written as: mailboxID@hostname. The hostname is a Fully Qualified Domain Name, for example, mail.ibm.com, of the mail server. In an on-the-fly e-mail address, the mailbox id is composed of several parts: a unique username, which identifies the user owning the mailbox; the sendername, which identifies the sender to which the on-the-fly disposable address was given; and a passcode. Ideally, the user uses a different passcode for each recipient. However, some e-mail users would find this inconvenient.

All e-mail systems, including on-the-fly disposable e-mail address systems, are susceptible to and must be protected against dictionary attacks. In a dictionary attack, a mass-mailer targets a mail server and uses a computer program to generate millions of username by combining common first and last names, and possibly initials and numerical suffixes. The mass-mailer hopes that a certain proportion of the random combinations will match existing username. Hence, in an on-the-fly e-mail system the passcode deters dictionary attacks. Typically, elaborate and complex algorithms are required to create and validate good passcodes. In addition, users are burdened with tracking and management of their disposable, secondary e-mail addresses.

While the above-described filtering techniques attempt to minimize the harmful effects of unsolicited mass e-mails, they use complex and costly software and/or servers that can be difficult to set up and maintain. Furthermore, existing filtering systems download the e-mails for processing. Many corporate filtering systems are typically server based, but they merely identify unsolicited mass e-mail messages and tag them as such. Therefore, the unsolicited e-mails clog the mailbox and network connection of the recipient. Another significant risk with the filtering techniques is that valid and valuable e-mails of interest may be discarded. If the filtered e-mails are held for further review and if the user is required to review the filtered e-mails to preclude this problem, then most of the advantages from filtering are lost. The time required to review tagged unsolicited e-mails is comparable to the disruption caused by unsolicited e-mails arriving at the user's regular mailbox. Accordingly, there remains a need for a simple, yet effective way of restricting and reducing unsolicited e-mails.

SUMMARY OF THE INVENTION

To overcome the limitations in the prior art described above, and to overcome other limitations that will become apparent upon reading and understanding the present specification, various embodiments of a method, system and computer program product for providing e-mail from a user with a primary e-mail address, are described. A temporary e-mail address is generated. The temporary e-mail address is associated with a time decay attribute and the primary e-mail address. The e-mail is sent using the temporary e-mail address as a sender e-mail address.

In various embodiments, the temporary e-mail address is deactivated based on an amount of time that has elapsed since the temporary e-mail address was generated, and an amount of time specified by the time decay attribute.

In this way, unsolicited e-mail can be restricted and reduced.

BRIEF DESCRIPTION OF THE DRAWINGS

The teachings of the present invention can be readily understood by considering the following description in conjunction with the accompanying drawings, in which:

FIG. 7 depicts a diagram of the exemplary e-mail of FIG. 4 which was sent using a send time decayed function, as displayed by an e-mail client in an e-mail client window at a computer used by the recipient;

FIG. 8 depicts another diagram of the exemplary e-mail of FIG. 4 which was sent using the send time decayed function, as displayed in the e-mail client window at a computer used by the recipient;

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to reduce unsolicited mass e-mail. A method, apparatus and article of manufacture provide e-mail from a user with a primary e-mail address. A temporary e-mail address is generated. The temporary e-mail address is associated with a time decay attribute and the primary e-mail address. The e-mail is sent using the temporary e-mail address as a sender e-mail address.

The primary e-mail address refers to an e-mail address of greater durability than the temporary e-mail address. In other words, the primary e-mail address is typically able to exist for a longer time than the temporary e-mail address.

In various embodiments, a "Send Time Decayed" function is provided in addition to the conventional "Send" function for existing and future e-mail applications. When the "Send Time Decayed" function is utilized, a mail server dynamically generates a temporary e-mail address and uses this temporary e-mail address in place of the sender's primary e-mail address. The temporary e-mail address is associated with a time decay attribute to provide a time decayed temporary e-mail address. The temporary e-mail address becomes obsolete after the time specified in the associated time decay attribute has elapsed. Replies which are received within the time specified in the associated time decay attribute are forwarded to the sender's primary e-mail address; otherwise the mail server deems that the replies are undeliverable and are discarded. The time decayed temporary e-mail address typically provides a very small window of opportunity for mass mailers to harvest and utilize the temporary e-mail addresses. Typically, any harvested temporary e-mail addresses will have expired by the time they are harvested and/or utilized by mass mailers. In an alternate embodiment, only the "Send Time Decayed" function is provided and all e-mails are sent using a time decayed e-mail address.

In this description, the terms "time decayed temporary e-mail address" and "time decayed e-mail address" are synonymous.

Figure 1:
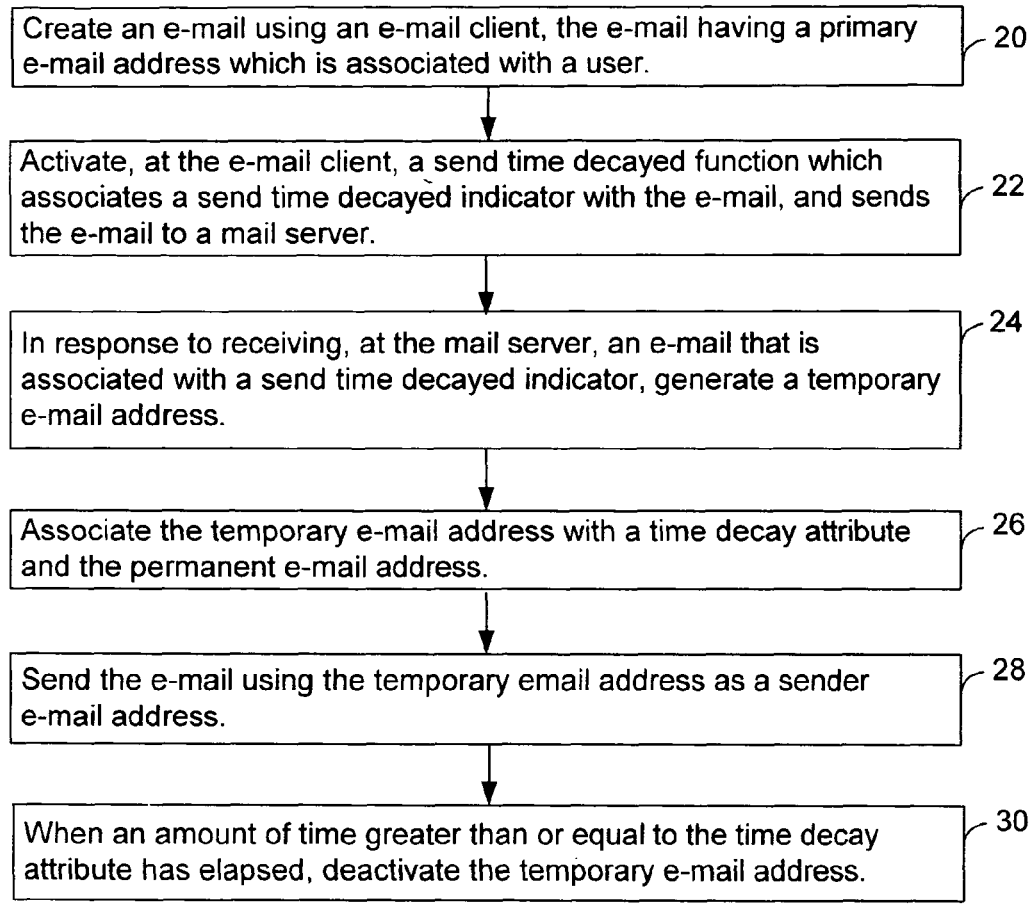
FIG. 1 depicts a high-level flowchart of an embodiment of a technique for a time decayed e-mail address.

FIG. 1 depicts a high-level flowchart of an embodiment of a technique for a time decayed e-mail address. In step 20, an e-mail is created using an e-mail client. The e-mail has a primary e-mail address which is associated with a user. In step 22, a send time decayed function is activated at the e-mail client. The send time decayed function associates a send time decayed indicator with the e-mail and sends the e-mail to a mail server. In step 24, in response to receiving, at the mail server, an e-mail that is associated with a send time decayed indicator, a temporary e-mail address is generated. In some embodiments, the temporary e-mail address is generated based on the primary e-mail address. In step 26, the temporary e-mail address is associated with a time decay attribute and the primary e-mail address. In step 28, the e-mail is sent using the temporary e-mail address as a sender e-mail address.

In step 30, when an amount of time greater than or equal to the time decay attribute has elapsed since the temporary e-mail address was generated, the temporary e-mail address is deactivated. In another embodiment, when an amount of time equal to the time decay attribute has elapsed since the temporary e-mail address was generated, the temporary e-mail address is deactivated. In yet another embodiment when an amount of time greater than the time decay attribute has elapsed since the temporary e-mail address was generated, the temporary e-mail address is deactivated.

Figure 2:
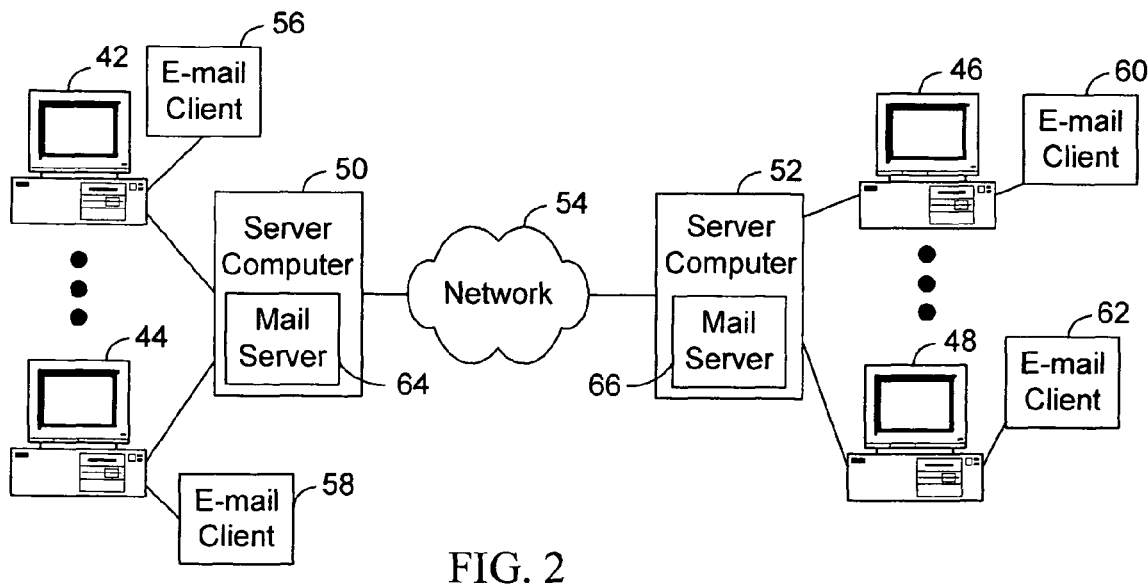
FIG. 2 depicts a high-level block diagram of mail servers coupled via a network suitable for use with various embodiments of the present invention.

FIG. 2 depicts a high-level block diagram of mail servers coupled via a network suitable for use with various embodiments of the present invention. Client computers 42-44 and 46-48, are coupled to first and second server computers, 50 and 52, respectively, which are coupled by a network 54. The client computers 42-44 and 46-48 execute an e-mail client 56-58 and 60-62 to create, send, receive and manage their e-mail. The first and second server computers, 50 and 52, execute a mail server 64 and 66, which communicates with the e-mail clients, 56-58 and 60-62, respectively. The mail servers 64 and 66 are associated with one or more users, each of which has a primary e-mail address at the mail server. For example, the primary e-mail address has a format such as username#server.com. In the mail server 64 and 66, each primary e-mail address is associated with a mailbox that contains their e-mails. In some mail servers, the mailbox of a user is associated with the mailbox id of the primary e-mail address, and the username is the mailbox id. The mail server 64, 66 sends e-mails passed from the e-mail clients 56-58 and 60-62 to the network 54, and receives e-mails destined for the mail server's associated e-mail addresses. In another embodiment, the mail server executes on the same computer as an e-mail client.

For example, to send an e-mail, a user at a client computer 42 executes the e-mail client 56 which communicates with the first mail server 64. Using the client e-mail program 56, the user creates an e-mail message, specifying a recipient. The user activates a send function which causes the e-mail client 56 to send the e-mail to the mail server 64. If the e-mail address of the recipient is not associated with the mail server 64, the mail server 64 sends the e-mail to the recipient over the network 54. The e-mail arrives at the second mail server 66 which is associated with the e-mail address of the recipient. The second mail server 66 stores the e-mail in a mailbox associated with the e-mail address of the recipient. The e-mail is subsequently sent to the recipient's e-mail client 60.

The mail servers 64, 66 and e-mail clients 56-58 and 60-62 implement time decayed e-mail addresses in accordance with an embodiment of the present invention. In the e-mail client 56, a send time decayed function is provided. The send time decayed function provides a time decayed indicator to the mail server 64, 66, and in response to detecting the time decayed indicator the mail server 64, 66 performs the send time decayed function. In various embodiments, the mail server 64, 66 performs the technique for a time decayed e-mail address of steps 24-30 of FIG. 1.

Figure 3:
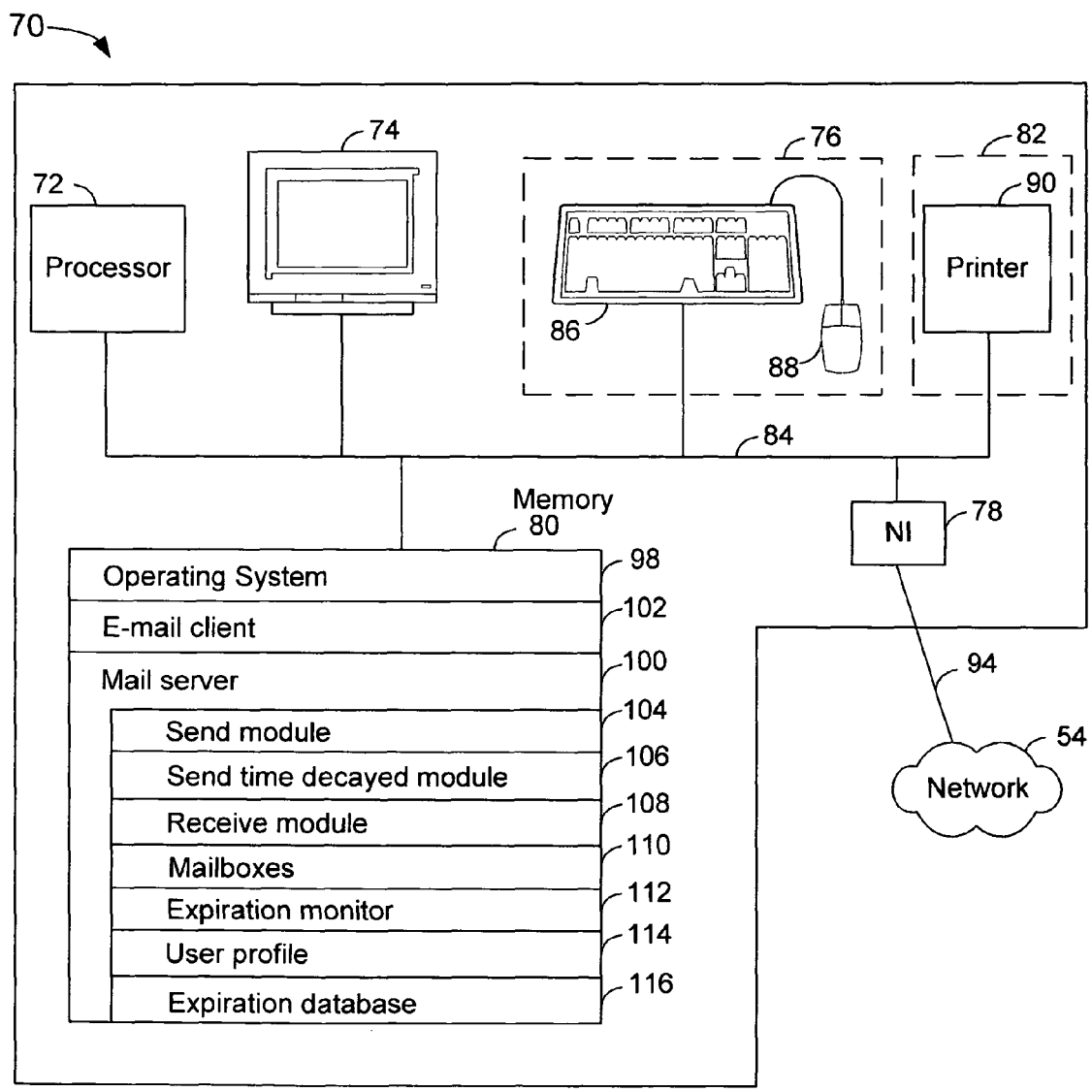
FIG. 3 depicts an illustrative computer system which uses various embodiments of the present invention.

FIG. 3 depicts an embodiment of an illustrative computer system 70 which uses various embodiments of the present invention. In various embodiments, the computer system 70 is used as the server computer 50, 52 of FIG. 2. The computer system 70 comprises a processor 72, display 74, input interfaces (I/F) 76, communications interface 78, memory 80 and output interface(s) 82, all conventionally coupled by one or more buses 84. The input interfaces 76 comprise a keyboard 86 and a mouse 88. The output interface 82 comprises a printer 90. The communications interface 78 is a network interface (NI) that allows the computer 70 to communicate via the network 54. The communications interface 78 may be coupled to the network 54 via a transmission medium 94 such as a network transmission line, for example twisted pair, coaxial cable or fiber optic cable. In another embodiment, the communications interface 78 provides a wireless interface, that is, the communications interface 78 uses a wireless transmission medium.

The memory 80 generally comprises different modalities, illustratively semiconductor memory, such as random access memory (RAM), and disk drives. In various embodiments, the memory 80 stores an operating system 98, a mail server 100 and, in some embodiments, an e-mail client 102.

In various embodiments, the mail server 100 comprises a send module 104, a send time decayed module 106, a receive module 108, mailboxes 110, an expiration monitor 112, a user profile 114 and an expiration database 116.

In various embodiments, the specific software instructions, data structures and data that implement various embodiments of the present invention are typically incorporated in the mail server 100, and in some embodiments, are also incorporated in the e-mail client 102. Generally, an embodiment of the present invention is tangibly embodied in a computer-readable medium, for example, the memory 80, and is comprised of instructions which, when executed by the processor 72, cause the computer system 70 to utilize the present invention. The memory 80 may store the software instructions, data structures and data for any of the operating system 98, mail server 100, and in some embodiments, the e-mail client 102 in semiconductor memory, in disk memory, or a combination thereof. Other computer memory devices presently known or that become known in the future, or combination thereof, may be used for memory 80.

The operating system 98 may be implemented by any conventional operating system such as AIX® (Registered Trademark of International Business Machines Corporation), UNIX® (UNIX is a registered trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 3 is not intended to limit the present invention. Other alternative hardware environments may be used without departing from the scope of the present invention.

In various embodiments, the technique for a time decayed e-mail address is implemented in a mail server accessible via a network 54 such as the Internet, for example, Yahoo Mail or e-mail applications such as IBM® (Registered Trademark of International Business Machines Corporation) Lotus Notes® (Registered Trademark of International Business Machines Corporation) and Microsoft® (Registered Trademark of Microsoft Corporation) Outlook® (Registered Trademark of Microsoft Corporation).

In various embodiments, when a user applies for a primary e-mail address, in addition to providing conventional information, the user specifies a time duration, that is, the time decay attribute, for one or more temporary e-mail addresses that will be generated and used on that user's behalf. The time decay attribute is typically specified using a number of days; however, other time periods may be used. The mail server saves this information in a user profile to be used later. When initially providing the time decayed e-mail address function for existing users having existing primary e-mail addresses, a predetermined default value for the time decay attribute for the temporary e-mail addresses will be used, unless the user specifies a different value. For example, the time decay attribute may be five days. The time decay attribute results in the temporary e-mail addresses becoming obsolete after the associated time has elapsed. In some embodiments, the sender explicitly assigns a time decay attribute for his e-mail message before sending the message. For example, in a field marked with "Good For:" or "Reply Within:", the sender communicates the desired number of days within which the sender prefers a response back from recipients to his e-mail message. In some embodiments, explicit specification of the value of the time decay attribute in the e-mail overrides the value in the sender's user profile. In another embodiment, the sender is provided with the capability to update that sender's user profile with a different value of the time decay attribute as desired.

In various embodiments, the e-mail client provides a graphical user interface for the user to create, send, receive and manage e-mail.

Figure 4:
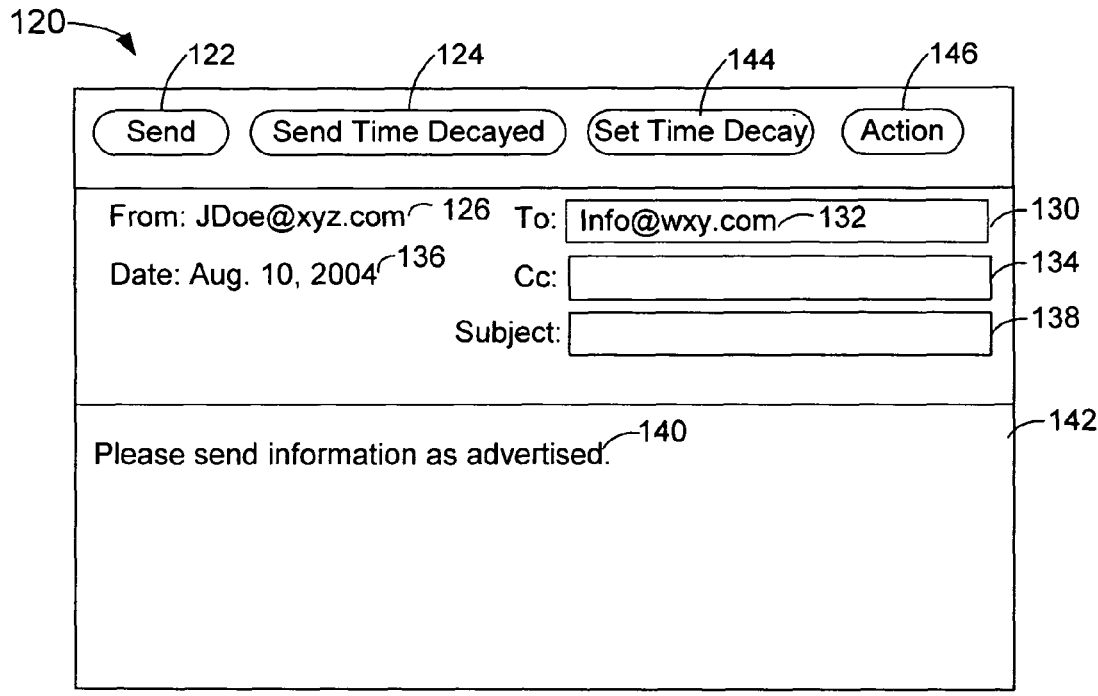
FIG. 4 depicts an exemplary e-mail client window of a graphical user interface provided by the e-mail client to create an e-mail.

FIG. 4 depicts an exemplary e-mail client window 120 of the graphical user interface provided by the e-mail client to create an e-mail. The "Send Time Decayed" function is provided in addition to the conventional "Send" function. The conventional Send function is initiated or activated in response to activating a "Send" button 122. Activating refers to clicking on an object, such as a button or menu item, or using the keyboard to select that object. In various embodiments, the "Send Time Decayed" function is activated in response to activating a "Send Time Decayed" button 124.

The e-mail client window displays the user's primary e-mail address 126. A "To" text area 130 contains one or more recipient e-mail addresses 132, and a "Cc" text area 134 may contain one or more e-mail addresses of additional recipients to receive the e-mail message. The date 136 of the e-mail is also displayed. A subject text area 138 may be used to enter the subject matter of the e-mail. The sender enters the message content 140 in the message body area 142.

In response to activating the "Send" button 122, the e-mail is sent in a conventional manner to the mail server.

In response to activating the "Send Time Decayed" button 124, the e-mail client sends the e-mail message with a send time decayed indicator to the mail server, the mail server generates a temporary e-mail address and sends the e-mail using the temporary e-mail address to the network. More particularly, based on the information in the e-mail client window 120, the e-mail client generates an e-mail message comprising the user's primary e-mail address in a "From" or sender field, the e-mail addresses of the recipients in the "To" text area 130 in a "To" field, the e-mail addresses of the recipients in the "Cc" text area 134 in a "Cc" field, the subject in the subject text area 138 in a "subject" field, and the message content in the message body area 142 in a "body" field. In some embodiments, the send time decayed indicator is sent as a flag in a "send time decayed" field (not shown). This e-mail is sent to the mail server. In other embodiments, the send time decayed indicator is provided to the mail server in various other non-limiting forms, such as naming conventions, function identifiers, parameters, etc. These and many other techniques are well-known to those of ordinary skill in the art.

In various embodiments, a user may set the time decay attribute for the e-mail by activating the "Set Time Decay" button 144. In some embodiments, an "Action" button 146 is provided, and when activated, an action menu is displayed.

Figure 5:
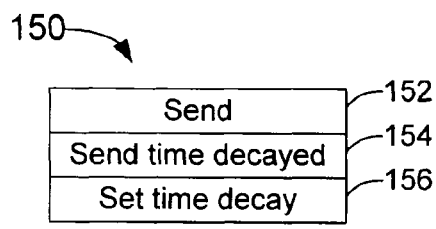
FIG. 5 depicts a diagram of an exemplary action menu which is displayed in response to activating an "Action" button in the e-mail client window of FIG. 4.

FIG. 5 depicts a diagram of an exemplary action menu 150 which is displayed in response to activating the "Action" button 146 (FIG. 4). The action menu 150 has a "Send" menu item 152, a "Send time decayed" menu item 154, and, in some embodiments, a "Set time decay" menu item 156. The "Send" menu item 152 causes the e-mail to be sent in the same manner as the "Send" button 122 (FIG. 4), and the "Send time decayed" menu item 154 causes the e-mail to be sent in the same manner as the "Send Time Decayed" button 124 (FIG. 4). The "Set time decay" menu item 156 allows a user to set the time decay attribute for the e-mail.

Figure 6:
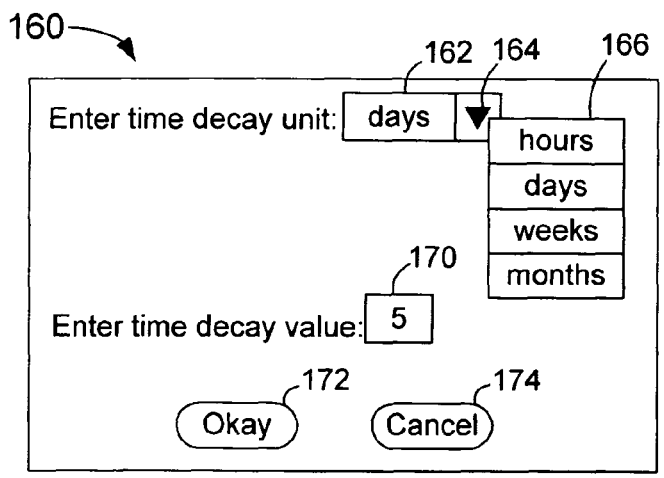
FIG. 6 depicts a diagram of an exemplary time decay window which is displayed in response to activating a set time decay button in the e-mail client window of FIG. 4 or the set time decay menu item in the action menu of FIG. 5.

FIG. 6 depicts a diagram of an exemplary time decay window 160 which is displayed in response to the set time decay button 144 (FIG. 4) or the set time decay menu item 156 (FIG. 5) being activated. The time decay window 160 allows a user to set the time decay attribute. In various embodiments, the time decay attribute comprises a time decay unit and a time decay value.

A time decay unit is entered in the time decay unit field 162. In response to clicking on the down arrow 164, a time decay unit drop-down list box 166 is displayed. The time decay unit drop-down list box 166 has a selection of units, which can be selected as menu items, such as hours, days, weeks and months. For example, a user may select the days menu item and the term "days" is displayed in the time decay unit field 162.

A value for the time decay is entered into the time decay value field 170. For example, a user may enter a value of five. If the time decay unit field is set to "days", the time decay attribute for the e-mail is five days.

In some embodiments, a user cannot set the time decay unit and the e-mail system uses a predefined time decay unit, for example, days.

To cause the time decay value to be associated with the e-mail as a specified time decay by the e-mail client, the user activates the okay button 172, and the specified time decay will be associated with the e-mail when it is sent to the mail server in response to activating the "Send Time Decayed" button 124 (FIG. 4). In various embodiments, the time decay attribute is sent as a separate field as part of the e-mail. In other embodiments, the time decay attribute for the e-mail is sent to the mail server by sending a separate file. In yet another embodiment, setting the time decay attribute changes the time decay attribute for the user.

In response to activating the "cancel" button 174, no time decay units or values associated with the e-mail are changed by the e-mail client and the time decay window is no longer displayed.

FIG. 7 depicts a diagram of the exemplary e-mail of FIG. 4 which was sent using the send time decayed function, as displayed by an e-mail client in an e-mail client window 180 at a computer used by the recipient. The e-mail client window 180 has a "From", "To", "Cc" and "Subject" areas. The "From" area displays the temporary e-mail address 182 that was generated by the mail server performing the send time decayed function. The date the e-mail was created is also displayed. An expiration indicator 184 is displayed. In some embodiments, the expiration indicator displays information regarding the time decay attribute associated with the temporary e-mail address, such as "This e-mail address is valid for 5 days". In various embodiments, the expiration indicator indicates the expiration date of the sender's temporary e-mail address, such as "Please reply on or before: Aug. 15, 2004". In this embodiment, the information for the expiration indicator such as the duration and/or the expiration date is provided in an expiration field in the e-mail. In various embodiments, the expiration indicator 184 is displayed with the "header" information for the e-mail. In other various embodiments, the expiration indicator is not displayed.

FIG. 8 depicts another diagram of the exemplary e-mail of FIG. 4 which was sent using the send time decayed function, as displayed in the e-mail client window 190 at a computer used by the recipient. In this embodiment, the expiration indicator 192 is in the message body. Prior to sending the e-mail, the sender's mail server added the expiration indicator to the message body.

Figure 9:
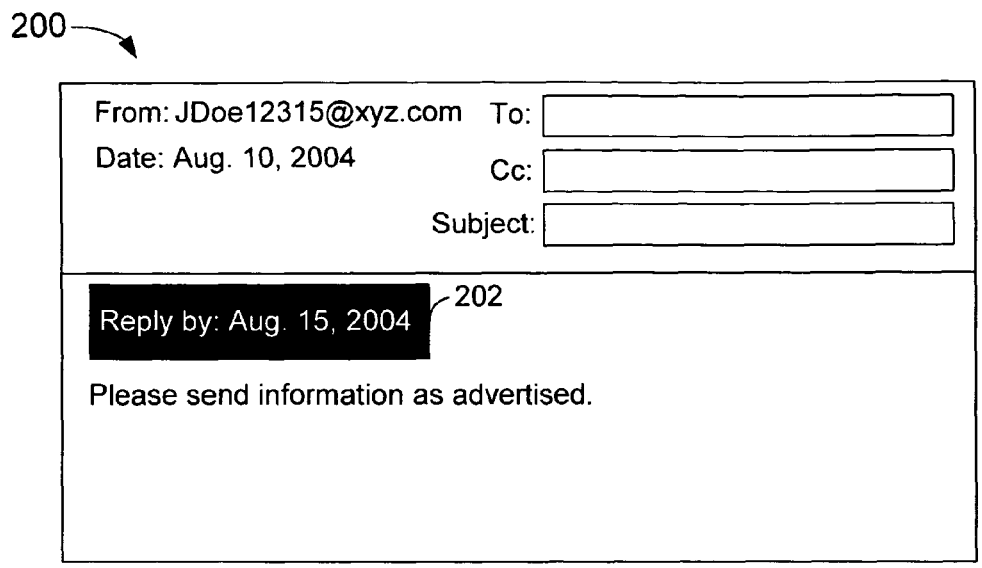
FIG. 9 depicts yet another diagram of the exemplary e-mail of FIG. 4 which was sent using the send time decayed function, as displayed in the e-mail client window at a computer used by the recipient.

FIG. 9 depicts yet another diagram of the exemplary e-mail of FIG. 4 which was sent using the send time decayed function, as displayed in the e-mail client window 200 at a computer used by the recipient. In this embodiment the expiration indicator 202 is implemented by Javascript.

Figure 10:
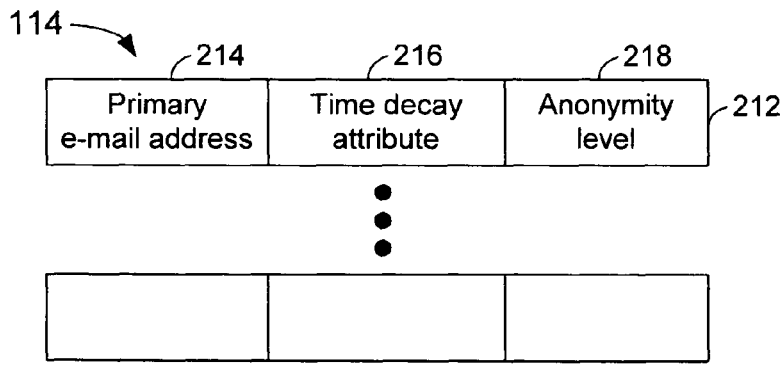
FIG. 10 depicts a diagram of an embodiment of the user profile of FIG. 3.

FIG. 10 depicts a diagram of an embodiment of the user profile 114. The user profile comprises rows or records 212. Each row 212 has a primary e-mail address column 214 and one or more columns that contain the time decay attribute 216. The user's primary e-mail address is stored in the primary e-mail address column 214. The time decay attribute associated with that user is stored in the one or more columns that contain the time decay attribute 216. The time decay attribute may be a default specified by the system when a new primary e-mail address is added, or specified by the user.

In various embodiments, the user profile also contains an anonymity level column 218 to contain an anonymity level. The anonymity level will be described in further detail below.

Figure 11:
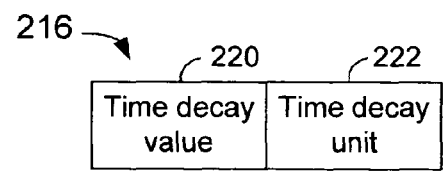
FIG. 11 depicts a diagram of an embodiment of one or more columns of the time decay attribute of FIG. 10.

FIG. 11 depicts a diagram of one or more columns that contain the time decay attribute 216 of FIG. 10. The one or more columns that contain the time decay attribute 216 comprise a time decay value column 220 and a time decay unit column 222. For example, the time decay value column 220 may contain a time decay value of three and the time decay unit column 222 may contain a time decay unit of "days." In other embodiments, the mail server uses a default time decay unit, and the one or more columns 216 of the time decay attribute comprise only the time decay value column 220.

Referring also to FIG. 6, in some embodiments, when the "Okay" button 172 is activated, the time decay attribute specified in the set time decay window 160 is stored in the time decay attribute column 216 of the row associated with the primary e-mail address of the user in the user profile 114.

Figure 12:
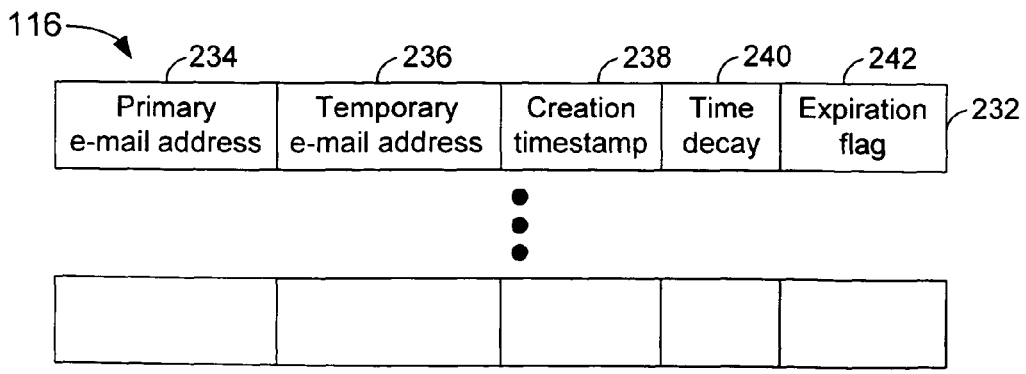
FIG. 12 depicts a diagram of an embodiment of the expiration database of FIG. 3.

FIG. 12 depicts a diagram of an embodiment of the expiration database 116. The expiration database 116 comprises one or more rows 232. Each row 232 comprises a primary e-mail address column 234, temporary e-mail address column 236, a creation timestamp column 238, a time decay column 240 and, in some embodiments, an expiration flag column 242. In this way, the temporary e-mail address is associated with the primary e-mail address.

A creation timestamp in the creation timestamp column 238 indicates when the temporary e-mail address was created. In some embodiments, the creation timestamp column is not used.

In some embodiments, the time decay represents an amount of time before the temporary e-mail address expires. A value of the time decay in the time decay column 240 is typically normalized with respect to a predefined time decay unit based on the time decay attribute in the user profile, such as days. For example, if the time decay is equal to two, the time decay is two days. In other embodiments, the time decay column 240 contains a time at which the temporary e-mail address expires.

In some embodiments, an expiration flag column 242 is used. The expiration flag column 242 contains an expiration flag. When the expiration flag is set to "Yes", the temporary e-mail address has expired and any received e-mails will be discarded. When the expiration flag is set to "No," e-mail received at the temporary e-mail address will be placed in the mailbox associated with the associated primary e-mail address. In other embodiments, the expiration flag is not used.

Figure 13:
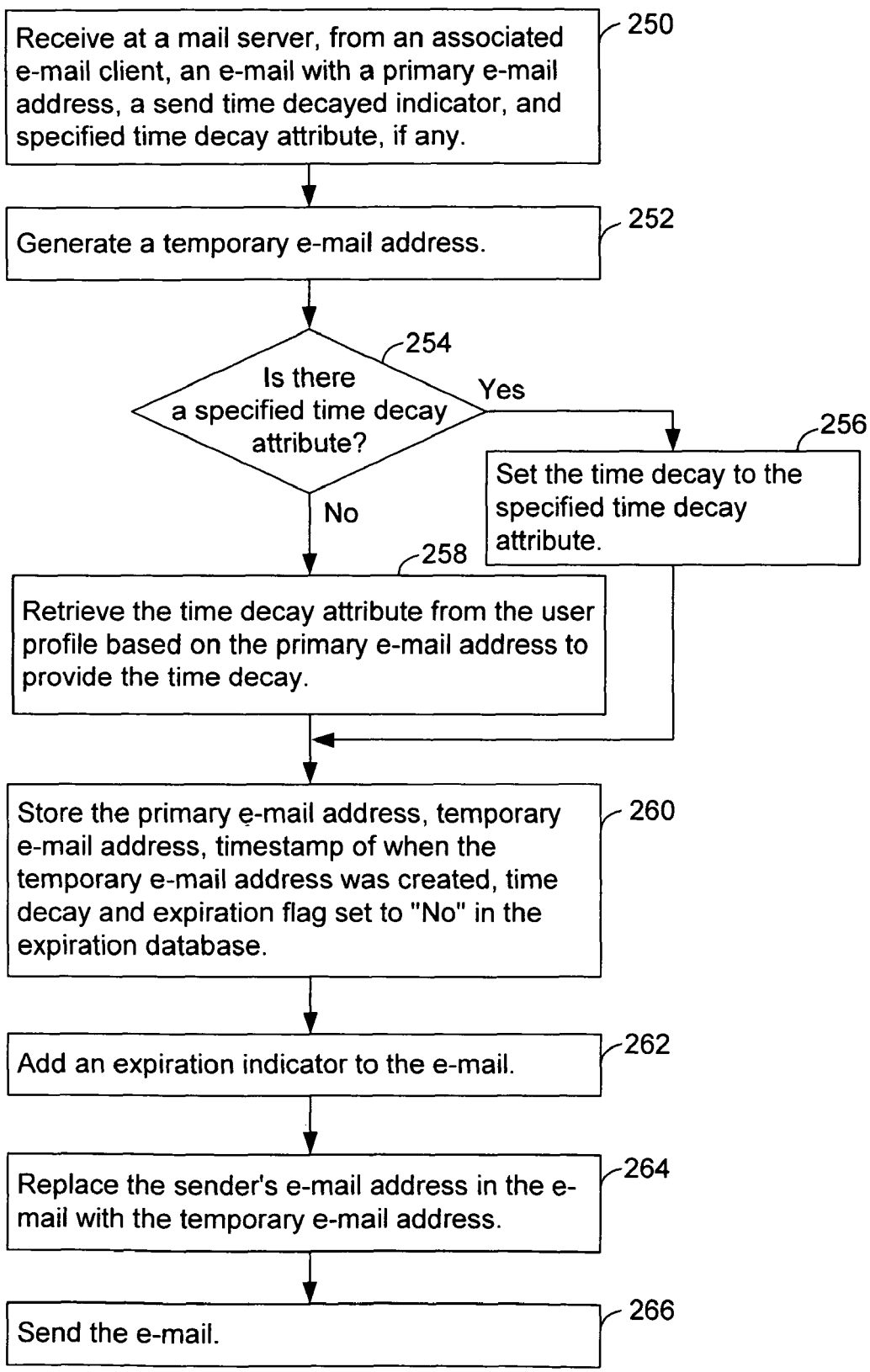
FIG. 13 depicts a flowchart of an embodiment of processing performed by the mail server to provide the send time decayed function.

FIG. 13 depicts a flowchart of an embodiment of processing performed by the mail server to provide the send time decayed function. In various embodiments, the flowchart of FIG. 13 is implemented in the send time decayed module 106 of FIG. 3.

In step 250, the mail server receives an e-mail from an associated e-mail client. The e-mail has a primary e-mail address, a send time decayed indicator, and may have a specified time decay attribute. In some embodiments, the specified time decay attribute is not used.

In step 252, the mail server generates a temporary e-mail address. In various embodiments, a value is generated and at least a portion of the value is added to zero, and in some embodiments, one, or more characters of the primary e-mail address to generate the temporary e-mail address. In some embodiments, the value comprises one or more numbers. In other embodiments, the value comprises one or more non-numerical characters. In yet other embodiments, the value comprises a combination of one or more numbers and non-numerical characters. Numerous algorithms and methods are known by those of ordinary skill in the art for generating values, random or otherwise. These, and those that may become known in the future, are anticipated by the present invention.

In various embodiments, at least a portion of the value is added to one or more characters of the primary e-mail address by appending the value to one or more characters of the mailbox id of the primary e-mail address. In other embodiments, at least a portion of the value is added to one or more characters of the primary e-mail address by prepending the value to one or more characters of the mailbox id of the primary e-mail address. In yet other embodiments, at least a portion of the value is added to one or more characters of the mailbox id of the primary e-mail address by inserting the value within the mailbox id of the primary e-mail address. In yet another embodiment, at least a portion of the value is added to one or more characters of the mailbox id of the primary e-mail address by interleaving the value with one or more characters of the primary e-mail address. For example, if the value is equal to "123", and the mailbox id of the primary e-mail address is "JDoe", a temporary e-mail address with interleaved characters may be "J1D2o3e". In some embodiments, only the value, or alternately, a portion of the value, is used as the mailbox id of the e-mail address to provide a temporary e-mail address.

In some embodiments, a pseudorandom number is generated and appended to the mailbox id portion of the primary e-mail address. For example, a three digit pseudorandom number is generated, such as 123. For the primary e-mail address: FirstnameLastname@us.ibm.com, the temporary e-mail address is FirstnameLastname123@us.ibm.com. In other embodiments, the pseudorandom number is used in the mailbox id portion of the original primary e-mail address, for example, 123@us.ibm.com.

Step 254 determines whether there is a specified time decay attribute in the e-mail. If so, in step 256, the time decay is set to the value of the specified time decay attribute. If not, in step 258, the time decay attribute value is retrieved from the time decay attribute column 216 (FIG. 10) in the user profile 114 (FIG. 10) based on the primary e-mail address to provide the time decay. In this way, the temporary e-mail address is associated with the time decay attribute.

In step 260, the mail server stores the primary e-mail address, the temporary e-mail address, a timestamp indicating when the temporary e-mail address was created, the time decay, and an expiration flag set to "No" in the primary e-mail address column 234 (FIG. 12), temporary e-mail address column 236 (FIG. 12), creation timestamp column 238 (FIG. 12), time decay column 240 (FIG. 12) and expiration flag column 242 (FIG. 12), respectively, in a row in the expiration database 116 (FIG. 12).

In step 262, an expiration indicator is generated and added to the e-mail. In some embodiments, the expiration indicator is a separate field in the e-mail that contains information related to the expiration of the temporary e-mail address. In other embodiments, the expiration indicator is added to the message body of the e-mail. In still other embodiments, the expiration indicator is not used, or its use may be optional. In step 264, the mail server replaces the sender name in the e-mail with the temporary e-mail address. In step 266, the mail server sends the e-mail to the recipient.

In another embodiment, the expiration flag is not used because a row containing the temporary e-mail address is deleted when that address expires. In another embodiment, the timestamp indicating when the temporary e-mail address was generated is not used, as further explained infra.

In some embodiments, a previously generated time decayed temporary e-mail address will be reused in a subsequent utilization of the "Send Time Decayed" function. For example, if a sender sends several e-mails to the same or different recipients on the same day, one temporary e-mail address may be used for all those e-mails.

Figure 14:
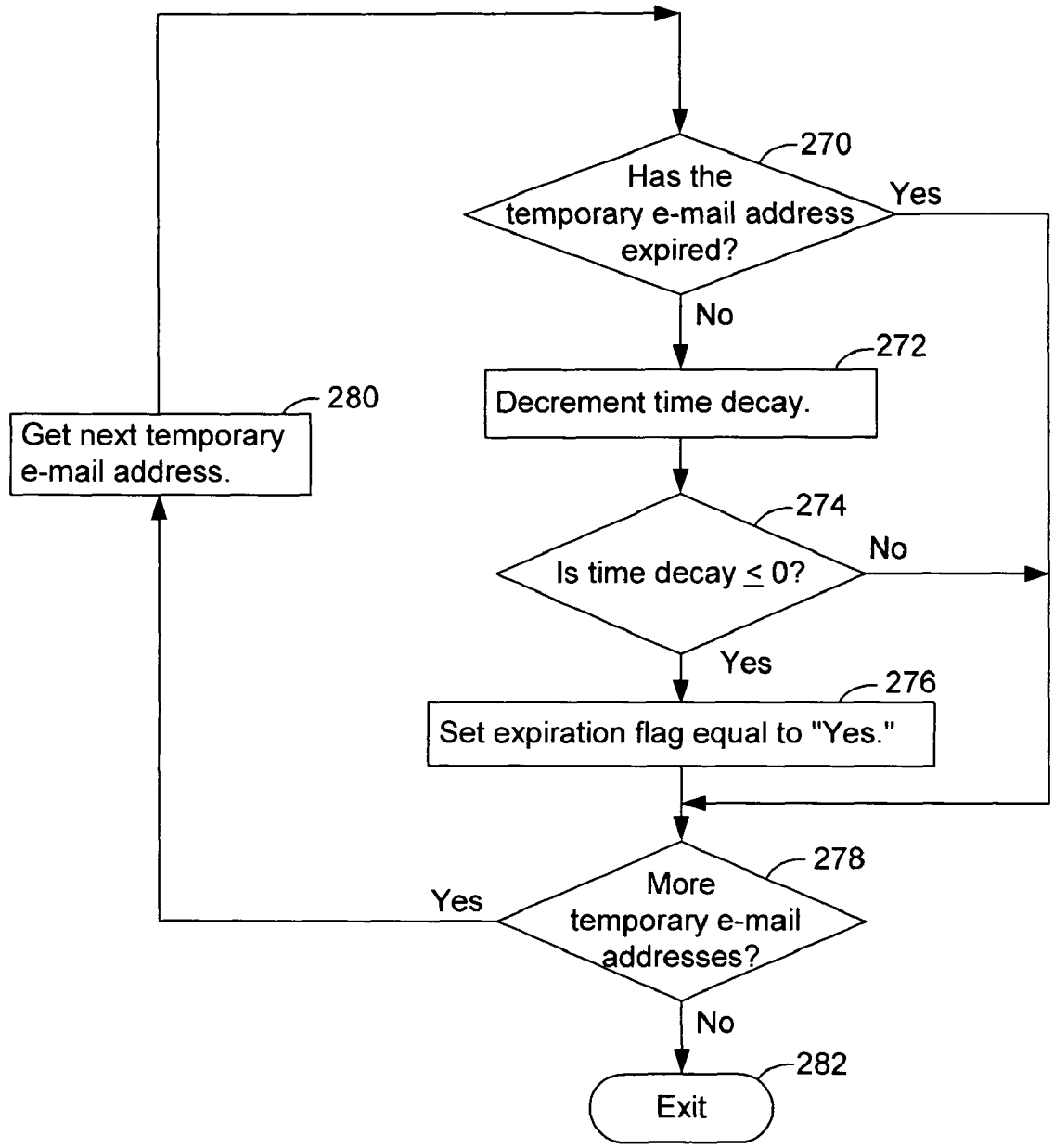
FIG. 14 depicts a flowchart of an embodiment of updating the time decay value.

FIG. 14 depicts a flowchart of an embodiment of updating the time decay value. In various embodiments, the flowchart of FIG. 14 is implemented in the expiration monitor 112 (FIG. 3). In some embodiments, the mail server updates the time decay values at a predetermined interval, for example, at a daily mail server recycling time, and to compensate for the time already passed, the time decay values in the expiration database are decreased by one day. In various embodiments, the mail server updates the time decay value of a particular temporary e-mail address when an e-mail is received for that e-mail address.

Step 270 determines whether the temporary e-mail address has expired. In some embodiments, the expiration flag associated with the temporary e-mail address is retrieved and if the expiration flag is set to "Yes", the temporary e-mail address has expired. In response to step 270 determining that the temporary e-mail address expired, control passes to step 278 to determine if more temporary e-mail addresses exist.

If step 270 determines that the temporary e-mail address has not expired, in step 272, the time decay is decremented. The time decay associated with the temporary e-mail address is retrieved from the expiration database, decremented and stored back in the expiration database. For example, in some embodiments, the time decay unit of the time decay attribute associated with the temporary e-mail address is days and flowchart of FIG. 14 is performed daily, therefore the time decay is decremented by one day. In other embodiments, the creation timestamp for the temporary e-mail address is retrieved. The creation timestamp is subtracted from the current time to provide an elapsed time. The elapsed time is converted to the time decay unit and rounded to a value based on the time decay unit to provide a normalized elapsed time. The normalized elapsed time is subtracted from the time decay.

Step 274 determines whether the time decay value is less than or equal to zero. If so, in step 276 the expiration flag associated with the temporary e-mail address is set to "Yes". Step 278 determines whether there are more temporary e-mail addresses. If so, in step 280, the next temporary e-mail address is retrieved and step 280 proceeds to step 270.

If step 274 determines that the time decay is greater than zero, step 274 proceeds to step 278. If step 278 determines that there are no more temporary e-mail addresses, in step 282, the flowchart exits.

In another embodiment, step 274 determines whether the time decay value is less than zero, and if so, proceeds to step 276. In this embodiment, if step 274 determines that the time decay is greater than or equal to zero, step 274 proceeds to step 278.

In yet another embodiment, step 274 determines whether the time decay value is equal to zero, and if so, proceeds to step 276. In this embodiment, if step 274 determines that the time decay is not equal to zero, step 274 proceeds to step 278.

In another embodiment, in step 276, the mail server deletes the row containing a temporary e-mail address for which the time decay value has less than or equal to zero, rather than setting an expiration flag. In this embodiment, step 270 is omitted.

Replies received at the mail server for the temporary e-mail address within the associated time duration (i.e., the time decay value is greater than zero) are stored in the mailbox associated with the primary e-mail address which is associated with the temporary e-mail address. Otherwise the replies are discarded. In the embodiment where the timestamp of the temporary e-mail address is recorded in the database, the difference between the time of the arrival of the reply e-mail and the associated creation timestamp in the expiration database is compared to the corresponding time decay value, and the reply e-mail is stored in the mailbox associated with the primary e-mail address which is associated with the temporary e-mail address, only if the time decay has not elapsed, that is, the difference is less than or equal to the time decay value.

Figure 15:
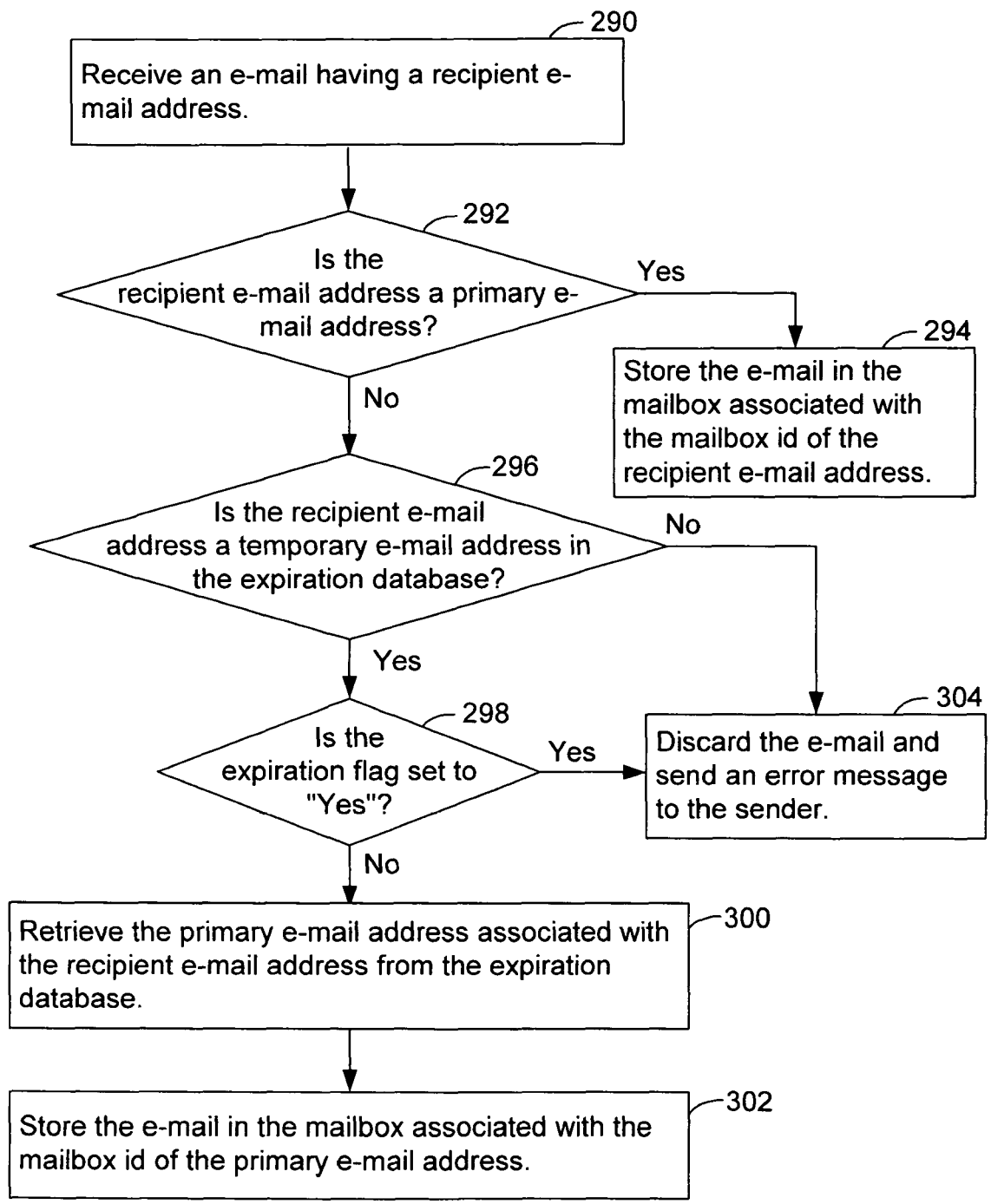
FIG. 15 depicts a flowchart of an embodiment of processing a received e-mail at the mail server.

FIG. 15 depicts a flowchart of an embodiment of processing a received e-mail at the mail server. In various embodiments, the flowchart of FIG. 15 is implemented in the receive module 108 of FIG. 3.

In step 290, the mail server receives an e-mail having a recipient e-mail address. Step 292 determines whether the recipient e-mail address is a primary e-mail address. If so, in step 294, the e-mail is stored in the mailbox associated with the mailbox id of the recipient e-mail address.

If step 292 determines that the recipient e-mail address is not a primary e-mail mail address, step 296 determines whether the recipient e-mail address is in the temporary e-mail address column of the expiration database. If so, the step 298 determines whether the expiration flag is set to "Yes" for that that temporary e-mail address. If step 298 determines that the expiration flag is not set for that temporary e-mail address, in step 300, the primary e-mail address associated with the recipient e-mail address is retrieved from the expiration database. In step 302, the e-mail is stored in the mailbox associated with the mailbox id of the primary e-mail address.

If step 296 determines that the recipient e-mail address is not a temporary e-mail address in the expiration database, in step 304, the e-mail is discarded and an error message is sent to the sender. If step 298, determines that the expiration flag is set to "Yes," step 298 likewise proceeds to step 304.

In some embodiments, when an expiration indicator is not used, an expired temporary e-mail address will have been deleted from the mail server, and step 298 is omitted.

In some embodiments, an API is provided to dynamically generate a time decayed temporary e-mail address when desired. As before, a record will be added to the expiration database to identify the requester's primary e-mail address, the generated temporary e-mail address and the specified time decay value. This is especially useful for when a user is hesitant to enter his/her primary e-mail address in Internet forms. The user can now enter the generated temporary e-mail address with piece of mind instead.

Figure 16:
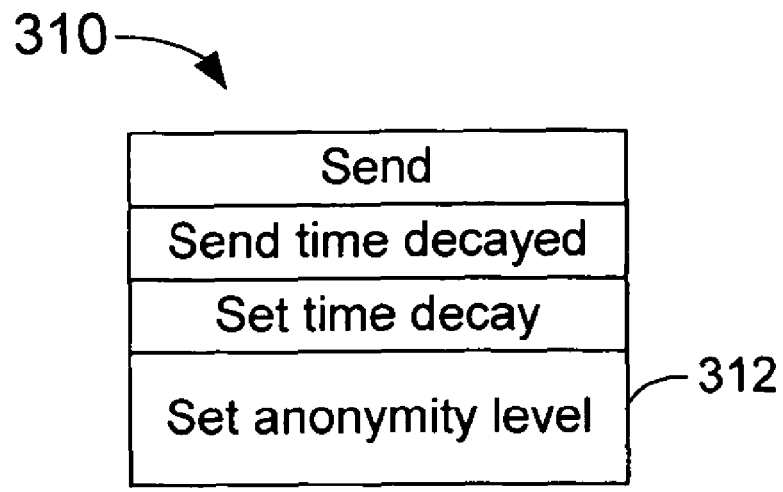
FIG. 16 depicts a diagram of an action menu which contains a menu item to set an anonymity level.

FIG. 16 depicts a diagram of an action menu 310 which contains a menu item to set an anonymity level. In various embodiments, a user may select a level of anonymity. The action menu 310 has a "Set anonymity level" menu item 312.

Figure 17:
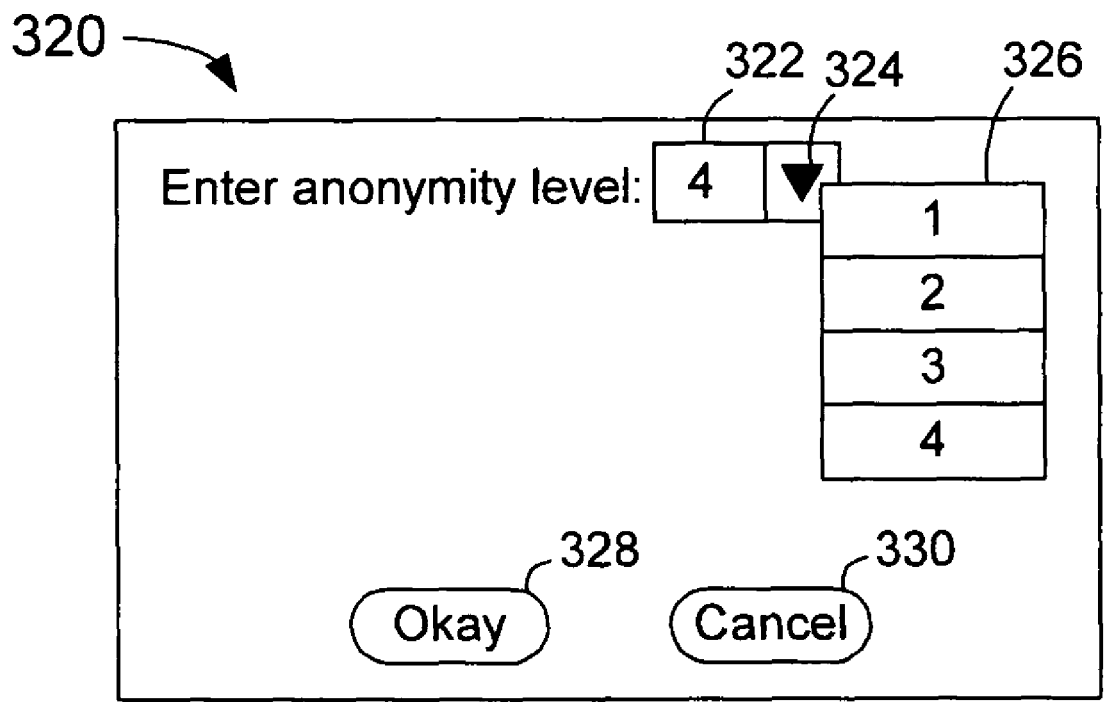
FIG. 17 depicts an embodiment of a "Set anonymity level" dialog box which is displayed in response to the "Set anonymity level" menu item of FIG. 16 being activated.

FIG. 17 depicts an embodiment of a "Set anonymity level" dialog box 320 which is displayed in response to the "Set anonymity level" menu item 312 of FIG. 16 being activated. The highest level of anonymity, a value of one, corresponds to using a generated value as described above with reference to step 252 of FIG. 13. The lowest level, in this example a value of four, corresponds to using the primary mailbox id with a predefined number of characters of the generated value. An intermediate level, for example, two, may correspond to a predetermined number of characters of the primary mailbox id with an appended value, for example, the first two characters of the mailbox id followed by a predefined number of digits of the generated value. In other embodiments, selected characters of the mailbox id may be mapped to other characters in accordance with a mapping algorithm, for example, "s" is changed to the fourth character following, a "w", then the generated value is added.

An anonymity level text area 322 displays a selected anonymity level. A down arrow 324, when activated, causes a drop-down menu 326 to be displayed. The drop down menu contains a set of anonymity levels to select from.

In response to activating the "Okay" button 328, the anonymity level is sent to the mail server and stored in the anonymity level column in a row of the user profile associated with the user's primary e-mail address. In response to activating the "Cancel" button 330, the "Set anonymity level" dialog box 320 is no longer displayed.

In various embodiments, when generating a temporary e-mail address 252 (FIG. 13), the mail server retrieves the anonymity level associated with the primary e-mail address from the user profile, and generates the temporary e-mail address in accordance with the anonymity level.

In some embodiments, the temporary e-mail address is used for a plurality of e-mails to different recipients. The temporary e-mail address is generated for a first e-mail to be sent to a first recipient. A second e-mail is created and is to be sent to a second recipient. If the elapsed time between sending the first e-mail and sending the second e-mail is less than a predetermined value, the second e-mail is sent to the second recipient using the temporary e-mail address. In some embodiments, the predetermined value is the value of the time decay 240 (FIG. 12) associated with the temporary e-mail address.

Although various embodiments of the technique for a time decayed e-mail address have been described in the context of a client-server environment, in another embodiment, the technique for a time decayed e-mail address is implemented in a single application which combines the functionality of the e-mail client and mail server and executes on a single computer system.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of processing an e-mail at a mail server, comprising:
   in response to receiving an e-mail with a time decayed indicator, generating a unique temporary e-mail address that is associated with a primary e-mail address of a sender of the e-mail, wherein the unique temporary e-mail address is distinct from the primary e-mail address and all other temporary e-mail addresses generated by the mail server; wherein the primary e-mail address has a mailbox identifier and a server identifier, wherein an algorithm generates an algorithm value comprising a plurality of characters, wherein the unique temporary e-mail address is generated by interleaving the plurality of characters of the algorithm value with the mailbox identifier of the primary e-mail address in accordance with an anonymity level associated with the primary e-mail address;
   sending the e-mail using the unique temporary e-mail address as a sender e-mail address;
   in response to receiving another e-mail with another time-decayed indicator from another sender, generating another unique temporary e-mail address that is associated with another primary e-mail address of the another sender, wherein the algorithm generates another algorithm value comprising another plurality of characters; wherein the another unique temporary e-mail address is generated by combining at least one character of the another plurality of characters of the another algorithm value with at least one character of a mailbox identifier of the another primary e-mail address in accordance with another anonymity level associated with the another primary e-mail address; wherein said combining is distinct from said interleaving; and
   sending the another e-mail using the another unique temporary e-mail address as a sender e-mail address of the another sender.

2. The method of claim 1 wherein a server identifier of the unique temporary e-mail address is identical to the server identifier of the primary e-mail address.

3. The method of claim 1 wherein a mailbox identifier of the unique temporary e-mail address is different from the mailbox identifier of the primary e-mail address.

4. The method of claim 2 wherein a server identifier of the unique temporary e-mail addresses is identical to a server identifier of the another unique temporary e-mail address.

5. The method of claim 1 wherein said combining forms the another unique temporary e-mail address by prepending the at least one character of the another plurality of characters of the another algorithm value to the mailbox identifier of the another primary e-mail address.

6. The method of claim 1, comprising:
   in response to an activation of a send-time-decayed function for the e-mail, associating the time decayed indicator with the e-mail, the e-mail having the primary e-mail address, and sending the e-mail with the time decayed indicator to the mail server.

7. The method of claim 6 further comprising:
   specifying a time decay attribute; and
   sending the time decay attribute to the mail server.

8. The method of claim 6 wherein the time decayed indicator comprises a time decay attribute.

9. The method of claim 6 further comprising:
   displaying a send-time-decayed button, wherein the send-time-decayed function is activated by activating the send-time-decayed button.

10. The method of claim 9 further comprising:
displaying a send button; and
in response to activating the send button, sending yet another e-mail without activation of the send-time-decayed function.

11. The method of claim 1 wherein the e-mail has a first recipient, and further comprising:
sending yet another e-mail to a second recipient using the unique temporary e-mail address as the sender e-mail address in response to an elapsed time between sending the e-mail and sending the yet another e-mail being less than a predetermined value.

12. The method of claim 1 further comprising:
adding an expiration indicator to the e-mail based on a time decay attribute.

13. The method of claim 1 further comprising:
deactivating the unique temporary e-mail address based on a determination that an amount of time that has elapsed since the unique temporary e-mail address was generated exceeds an amount of time specified by a time decay attribute.

14. The method of claim 13 wherein said deactivating deletes the unique temporary e-mail address.

15. The method of claim 13 wherein said deactivating sets an expiration flag associated with the unique temporary e-mail address.

16. The method of claim 13 wherein said deactivating is performed at a predetermined interval.

17. The method of claim 1 further comprising:
receiving yet another e-mail having a recipient e-mail address;
determining whether the recipient e-mail address matches the unique temporary e-mail address; and
in response to a determination that the unique temporary e-mail address is expired, discarding the yet another e-mail.

18. The method of claim 1 further comprising:
receiving yet another e-mail having a recipient e-mail address;
determining whether the recipient e-mail address matches the unique temporary e-mail address; and
in response to a determination that the unique temporary e-mail address is not expired,
identifying the primary e-mail address for which the unique temporary e-mail address was generated, and
storing the yet another e-mail in a mailbox associated with the primary e-mail address.

19. A computer program product for processing an e-mail at a mail server, the computer program product comprising:
a computer readable storage medium, wherein the computer readable storage medium is non-transitory;
first program instructions to, in response to receiving, at the mail server, an e-mail with a time decayed indicator, generate a unique temporary e-mail address that is associated with a primary e-mail address of a sender of the e-mail, wherein the unique temporary e-mail address is distinct from the primary e-mail address and all other temporary e-mail addresses generated by the mail server; wherein the primary e-mail address has a mailbox identifier and a server identifier, wherein an algorithm generates an algorithm value comprising a plurality of characters, wherein the unique temporary e-mail address is generated by interleaving the plurality of characters of the algorithm value with the mailbox identifier of the primary e-mail address in accordance with an anonymity level associated with the primary e-mail address;
second program instructions to send the e-mail using the unique temporary e-mail address as a sender e-mail address;
third program instructions to, in response to receiving another e-mail with another time-decayed indicator from another sender, generate another unique temporary e-mail address that is associated with another primary e-mail address of the another sender, wherein the algorithm generates another algorithm value comprising another plurality of characters; wherein the another unique temporary e-mail address is generated by combining at least one character of the another plurality of characters of the another algorithm value with at least one character of a mailbox identifier of the another primary e-mail address in accordance with another anonymity level associated with the another primary e-mail address; wherein said combining is distinct from said interleaving; and
fourth program instructions to send the another e-mail using the another unique temporary e-mail address as a sender e-mail address of the another sender;
wherein the first, second, third and fourth program instructions are stored on the computer readable storage medium.

20. The computer program product of claim 19 further comprising:
fifth program instructions to add, at the mail server, an expiration indicator to the e-mail based on a time decay attribute
wherein the fifth program instructions are stored on the computer readable storage medium.

21. The computer program product of claim 19 further comprising:
fifth program instructions to receive a time decay attribute;
wherein the fifth program instructions are stored on the computer readable storage medium.

22. A system to process an e-mail, comprising:
at least one processor; and
at least one memory comprising instructions, executable by the at least one processor, to:
in response to receiving an e-mail with a time decayed indicator, generate a unique temporary e-mail address that is associated with a primary e-mail address of a sender of the e-mail, wherein the unique temporary e-mail address is distinct from the primary e-mail address and all other temporary e-mail addresses generated by the at least one processor; wherein the primary e-mail address has a mailbox identifier and a server identifier, wherein an algorithm generates an algorithm value comprising a plurality of characters, wherein the unique temporary e-mail address is generated by interleaving the plurality of characters of the algorithm value with the mailbox identifier of the primary e-mail address in accordance with an anonymity level associated with the primary e-mail address;
send the e-mail using the unique temporary e-mail address as a sender e-mail address;
in response to receiving another e-mail with another time-decayed indicator from another sender, generate another unique temporary e-mail address that is associated with another primary e-mail address of the another sender, wherein the algorithm generates another algorithm value comprising another plurality of characters;

wherein the another unique temporary e-mail address is generated by combining at least one character of the another plurality of characters of the another algorithm value with at least one character of a mailbox identifier of the another primary e-mail address in accordance with another anonymity level associated with the another primary e-mail address; wherein said combining is distinct from said interleaving; and send the another e-mail using the another unique temporary e-mail address as a sender e-mail address of the another sender.

23. The system of claim 22 the memory comprising instructions to:

add an expiration indicator to the e-mail based on a time decay attribute.

24. The system of claim 22 the memory comprising instructions to:

receive a time decay attribute.

* * * * *